United States Patent
Stanciu et al.

(10) Patent No.: US 11,436,620 B2
(45) Date of Patent: Sep. 6, 2022

(54) FACILITATING THIRD PARTY UTILIZATION OF PERSONAL COMPUTING RESOURCES IN EXCHANGE FOR SOFTWARE USAGE

(71) Applicant: NortonLifeLock Inc., Tempe, AZ (US)

(72) Inventors: Andrei Stanciu, Bucharest (RO); Daniel Nicola, Bucharest (RO); Teodor Anton, Ploiesti (RO); Robert A. Clyde, Pleasant Grove, CA (US)

(73) Assignee: NortonLifeLock Inc., Tempe, AZ (US)

( * ) Notice: Subject to any disclaimer, the term of this patent is extended or adjusted under 35 U.S.C. 154(b) by 236 days.

(21) Appl. No.: 16/017,850

(22) Filed: Jun. 25, 2018

(65) Prior Publication Data
US 2019/0392468 A1    Dec. 26, 2019

(51) Int. Cl.
*G06Q 30/02*    (2012.01)
*G06F 11/30*    (2006.01)
(Continued)

(52) U.S. Cl.
CPC ..... *G06Q 30/0208* (2013.01); *G06F 11/3024* (2013.01); *G06F 11/3433* (2013.01);
(Continued)

(58) Field of Classification Search
CPC .......... H04L 63/1416; G06Q 20/3678; G06Q 40/02; G06Q 50/01
(Continued)

(56) References Cited

U.S. PATENT DOCUMENTS 9,876,806 B2 *   1/2018   Mondiguing ....... H04L 63/1416
2015/0310476 A1 * 10/2015   Gadwa ............... G06Q 30/0226
                                                705/14.27
(Continued)

OTHER PUBLICATIONS

European Patent Office; International Search Report and Written Opinion issued in PCT/EP2019/066669 dated Oct. 10, 2019; 7 pages.
(Continued)

*Primary Examiner* — Saba Dagnew
(74) *Attorney, Agent, or Firm* — Maschoff Brennan

(57) ABSTRACT

A method for facilitating utilization of processing resources of a plurality of user electronic devices for mining of cryptocurrency. A user application on each user device includes code for a cryptocurrency mining module and code for functionality different from cryptocurrency mining. Various mining activity data indicative of an extent to which each of the plurality of user electronic devices is utilized by a cryptocurrency mining pool to perform cryptocurrency mining operations is received. The method further includes receiving, from at least one of the cryptocurrency mining pool and a cryptocurrency server separate from the cryptocurrency mining pool, an aggregate amount of cryptocurrency. The aggregate amount cryptocurrency may be exchanged, by communicating with a cryptocurrency exchange server, for an aggregate amount of currency other than cryptocurrency. The method further includes allocating the aggregate amount of currency among user accounts respectively associated with the user electronic devices.

21 Claims, 8 Drawing Sheets

(51) Int. Cl.
*G06Q 20/06* (2012.01)
*G06Q 20/40* (2012.01)
*G06F 11/34* (2006.01)
*G06Q 20/38* (2012.01)

(52) U.S. Cl.
CPC ......... *G06Q 20/065* (2013.01); *G06Q 20/381* (2013.01); *G06Q 20/405* (2013.01); *G06Q 2220/00* (2013.01)

(58) Field of Classification Search
USPC .......................................... 705/37; 713/170
See application file for complete search history.

(56) References Cited

U.S. PATENT DOCUMENTS

| | | | | |
|---|---|---|---|---|
| 2015/0363876 | A1* | 12/2015 | Ronca | G06Q 40/04 705/37 |
| 2016/0117671 | A1* | 4/2016 | Kalinin | G06Q 20/4016 705/41 |
| 2016/0134593 | A1* | 5/2016 | Gvili | H04L 63/0428 713/170 |
| 2017/0249606 | A1* | 8/2017 | Pirooz | G06Q 40/02 |
| 2018/0060927 | A1* | 3/2018 | Gupta | G06Q 20/047 |
| 2018/0342106 | A1* | 11/2018 | Rosado | G06Q 50/01 |
| 2019/0386969 | A1* | 12/2019 | Verzun | H04L 9/3239 |

OTHER PUBLICATIONS

Crowdfunding Whitepaper; "The Golem Project"; Nov. 30, 2017; XP055495138; webpage located at: https://golem.netowrk/crowdfunding/Golemwhitepaper.pdf; 15 pages.

Gilles Fedak et al.; "Blockchain-Based Decentralized Cloud Computing"; Apr. 24, 2018; XP055628296; webpage located at: https://iex.ec/wp-content/uploads/pdf/iExec-WPv3.0-English.pdf; 40 pages.

Sergey Ponomarev et al.; "SONM—Supercomputer Organized by Network Mining" May 19, 2017; XP055628318; webpage located at: https://web/archive.org/web/20171118023409if_/http://sonm.io:80/Sonm1.pdf; 42 pages.

Rob Halford; "Gridcoin White Paper—The Computation Power of a Blockchain Driving Science & Data Analysis"; Mar. 3, 2018; XP055628313; webpage located at: https://gridcoin.us/assets/img/whitepaper.pdf; 12 pages.

* cited by examiner

FACILITATING THIRD PARTY UTILIZATION OF PERSONAL COMPUTING RESOURCES IN EXCHANGE FOR SOFTWARE USAGE

FIELD

This application is generally related to decentralized computing systems and, more particularly, to such systems in which owners of personal computing resources are incented to provide one or more third parties access to such resources.

BACKGROUND

Various electronic currencies, also known as cryptocurrencies, are typically generated through a "mining" process involving performance of a number of complex computations. These computations are carried out in order to generate "blocks" containing records of decentralized transactions made using the cryptocurrency. In order to successfully create a block, it is necessary to also produce a cryptographic hash fulfilling certain requirements. When the correct hash for a particular block is created, the "miner" (i.e., network node) responsible for creating the hash is generally awarded a certain amount of the cryptocurrency.

Because the cryptocurrency mining process typically requires substantial computing resources, approaches for distributing the mining of cryptocurrency among multiple user systems have been proposed. However, there are number of hurdles that an owner of an individual computer system (e.g., a personal computer, laptop computer or tablet computer) must overcome in order to earn cryptocurrency in exchange for permitting processing resources of the user's computer to be used for the mining of cryptocurrency. For example, most antivirus programs block or delete cryptocurrency mining software since it is often used by malware. This make it difficult for the average user to implement cryptocurrency mining on their computer system, since disabling an antivirus program in order to enable cryptocurrency mining software to be installed risks contaminating the user's computer system with malware. In addition, the fees accrued when exchanging cryptocurrency earned during such mining for conventional currency can be substantial in relation to the relatively small amounts of cryptocurrency typically involved in such exchange transactions. As a consequence, such transaction fees can consume much of the cryptocurrency earned during mining.

Finally, even in cases in which cryptocurrency mining software can be safely installed on a user's computer, execution of the mining software can adversely affect or interfere with performance of the computer. This may be particularly problematic in the case of computer systems designed to accommodate computer game applications by, for example, being configured with high-performance graphics processing units and substantial memory resources. Users purchasing such systems tend to want to minimize interferences in game performance caused by the execution of other programs. However, game performance may often noticeably decrease when another program, such as, for example, a cryptocurrency mining program, begins to heavily utilize system resources.

SUMMARY

Disclosed herein is a system and method for enabling users of electronic devices to rent or otherwise allow utilization of at least portion of the processing of such resources in exchange for software usage rights, licenses or other privileges or rewards. The system may be managed by an application having user components executed by the plurality of electronic user devices and a server component executed by a server. In one implementation each user component of the application is included within an antivirus program instantiated on one of the electronic user devices. One feature of such implementations is that cryptocurrency mining can occur even when antivirus protection is enabled, which would otherwise typically block or preclude cryptocurrency mining from occurring because of its frequent association with malware.

During operation of the system, users of the electronic user devices effectively rent, lease or otherwise permit usage of processing power of their respective user devices in order to perform computational tasks, such as hashing, relating to the mining of cryptocurrencies. As is discussed below, the application uses the processing (or "hashing") power of the user devices to perform such mining operations with minimal impact on the system. In exchange for permitting the processing power of their respective user devices to be exploited for purposes of cryptocurrency mining, users of the user devices are provided with rewards or other incentives. For example, in cases in which the user components of the application are included within an antivirus program, such rewards could comprise a free or discounted subscription to the antivirus program or service. In addition, the application may be configured to measure or otherwise meter the usage of the processing resources of the user device in connection with cryptocurrency mining and accordingly adjust the amount of the reward or incentive provided. In this way a user willing to permit a third party to utilize the processing resources of the user's electronic user device is provided with the opportunity to use valuable software applications (e.g., like antivirus software) for free or at a reduced cost.

During operation of the system, the application effectively forwards the hashing power of the participating user devices to a cryptocurrency mining pool (which may or may not be owned by the application). By facilitating the mining process carried out by the mining pool in this way, the application receives a reward from the operator or the mining pool that is generally in the form of a cryptocurrency (e.g., BitCoin or Ethereum). At least a portion of the reward is then credited to user accounts, or "wallets", created and administered for each user by the application. The application will generally effect such crediting to user accounts or wallets on a pro rata basis; that is, each user account is credited in accordance with the amount of cryptocurrency mining performed by the user device(s) associated the user account. The money (cryptocurrency or traditional currency) in the account, or "wallet", of each user can be used to pay for different services or products offered through the application.

In one embodiment the application pools cryptocurrency associated with some or all of the user wallets and creates a pooled transaction with a coin exchange party. As a result of the exchange transaction, the cryptocurrency or "crypto coins" pooled from the user wallets are transformed into a conventional currency, such as dollars or euros. The application then updates the balance of each user account or wallet to reflect the user's pro rata share of the conventional currency received through the exchange transaction. In this way the application advantageously makes both cryptocurrency mining process itself and the process of receiving compensation for the mining conducted by the electronic user devices transparent to the users of such devices.

The application will typically inform a user device of the extent to which an application license renewal or other reward has been accrued as a consequence of the utilization of the processing resources (e.g., CPU or GPU resources) of the client device in cryptocurrency mining. The application will generally provide users with a straightforward way to configure parameters governing the extent to which mining activities may be performed by the client devices. For example, the application may permit a user to set a limit on the amount (or percentage) of CPU used, to specify that mining may only occur when the client device is idle, to specify that mining may not occur during full screen or game mode, or that mining must not occur when less than a predefined amount of energy remains in the batteries of the client device (in the case of portable client devices). In one embodiment the default settings relating to such parameters would only permit mining to occur when the user device was otherwise idle. Alternatively, the default settings could specify that mining could be carried out only using certain processor cores (in the case of multi-core user devices). A user could have the option to accept such default setting or to change the parameter settings to allow for more "aggressive" mining, which could result in a corresponding degradation in the ability of the user device to perform tasks unrelated to mining.

In one aspect the disclosure relates to a method for facilitating utilization of processing resources of a plurality of user electronic devices for mining of cryptocurrency. The plurality of user electronic devices are configured with a corresponding plurality of user applications, each of the plurality of user applications including code for a cryptocurrency mining module and code for functionality different from the mining of cryptocurrency. The method includes receiving, from each of the plurality of user electronic devices, mining activity data indicative of the extent to which each of the plurality of user electronic devices is utilized by a cryptocurrency mining pool to perform cryptocurrency mining operations. Each of the user applications may be configured with application settings establishing conditions under which a corresponding one of the plurality of user electronic devices may be utilized to perform the cryptocurrency mining operations. The method further includes receiving, from at least one of the cryptocurrency mining pool and a cryptocurrency server separate from the cryptocurrency mining pool, an aggregate amount of cryptocurrency. The aggregate amount cryptocurrency may be exchanged, by communicating with a cryptocurrency exchange server, for an aggregate amount of currency other than cryptocurrency. The method further includes allocating the aggregate amount of currency among a plurality of user accounts respectively associated with the plurality of user electronic devices.

The method may further include monitoring usage of computer resources by processes executing on at least one of the plurality of user electronic devices and determining, based upon the monitoring, that one of the processes is consuming greater than a predefined threshold of the computer resources. In this case ones of the processes corresponding to the cryptocurrency mining operations may be stopped or execution of one or more scheduled tasks corresponding to the cryptocurrency mining operations may be delayed.

The disclosure also pertains to a user electronic device configured for mining of cryptocurrency. The user electronic device includes a processor and a memory including computer code executable by the multicore processor. The computer code includes code for a user application including code for a cryptocurrency mining module and code for functionality different from the mining of cryptocurrency. The code for the cryptocurrency mining module is configured to cause the processor to send mining activity data indicative of the extent to which the user electronic device is utilized by a cryptocurrency mining pool to perform cryptocurrency mining operations. The user application is configured with application settings establishing conditions under which the user electronic device may be utilized to perform the cryptocurrency mining operations. The computer code further includes code for monitoring usage of processor resources by processes executing on the processor and for determining, based upon the monitoring usage, that one of the processes is consuming greater than a predefined threshold of the computer resources. In this case ones of the processes corresponding to the cryptocurrency mining operations may be stopped or execution of one or more scheduled tasks corresponding to the cryptocurrency mining operations may be delayed.

The processor of the user electronic device may be implemented using a multicore processor having a plurality of cores disposed to execute the plurality of processes. In this case the computer code further includes code for allocating one or more of the plurality of cores to ones of the processes corresponding to the cryptocurrency mining operations wherein other of the plurality of cores are allocated to remaining ones of the processes.

In one aspect the cryptocurrency mining operations are not performed when the user electronic device is detected to be operating in a game mode. The mining operations may be resumed once it has been subsequently detected that the user electronic device is no longer operating in the game mode.

In one aspect the disclosure relates to a method for improving performance of a game process in a multicore computer system configured for cryptocurrency mining. The method includes automatically detecting the game process that has begun executing on one or more of a plurality of cores of the multicore processor. Following detection of the game process, processes associated with the cryptocurrency mining operations are automatically allocated to one of the plurality of cores different from the processor core or cores on which the game process is executing. Upon detecting that an application corresponding to the game process has transitioned from an interactive state or that the game process has terminated, one or more other of the plurality of cores may be allocated to the cryptocurrency mining operations.

The method may alternately or additional include determining a number of the plurality of cores required to be utilized by the game process in order to meet one or more performance criteria. Upon this determination being made the game process may be allocated to the determined number of the plurality of cores. The method further includes parking one or more remaining cores in order to reduce heat generated by the processor, potentially allowing the system to increase the processor's frequency, and thereby improve performance of the game process.

By dedicating computer resources to a high-utilization process such as a computer game, a 4K or High Definition video, other graphics applications or, more generally, other applications requiring high CPU usage, any decreases in performance due to interference from cryptocurrency mining operations can be minimized and potentially not detectable by the user. Because the detection is automated, less computer-experienced users can benefit from the disclosed optimizations without having to interact with the computer system.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
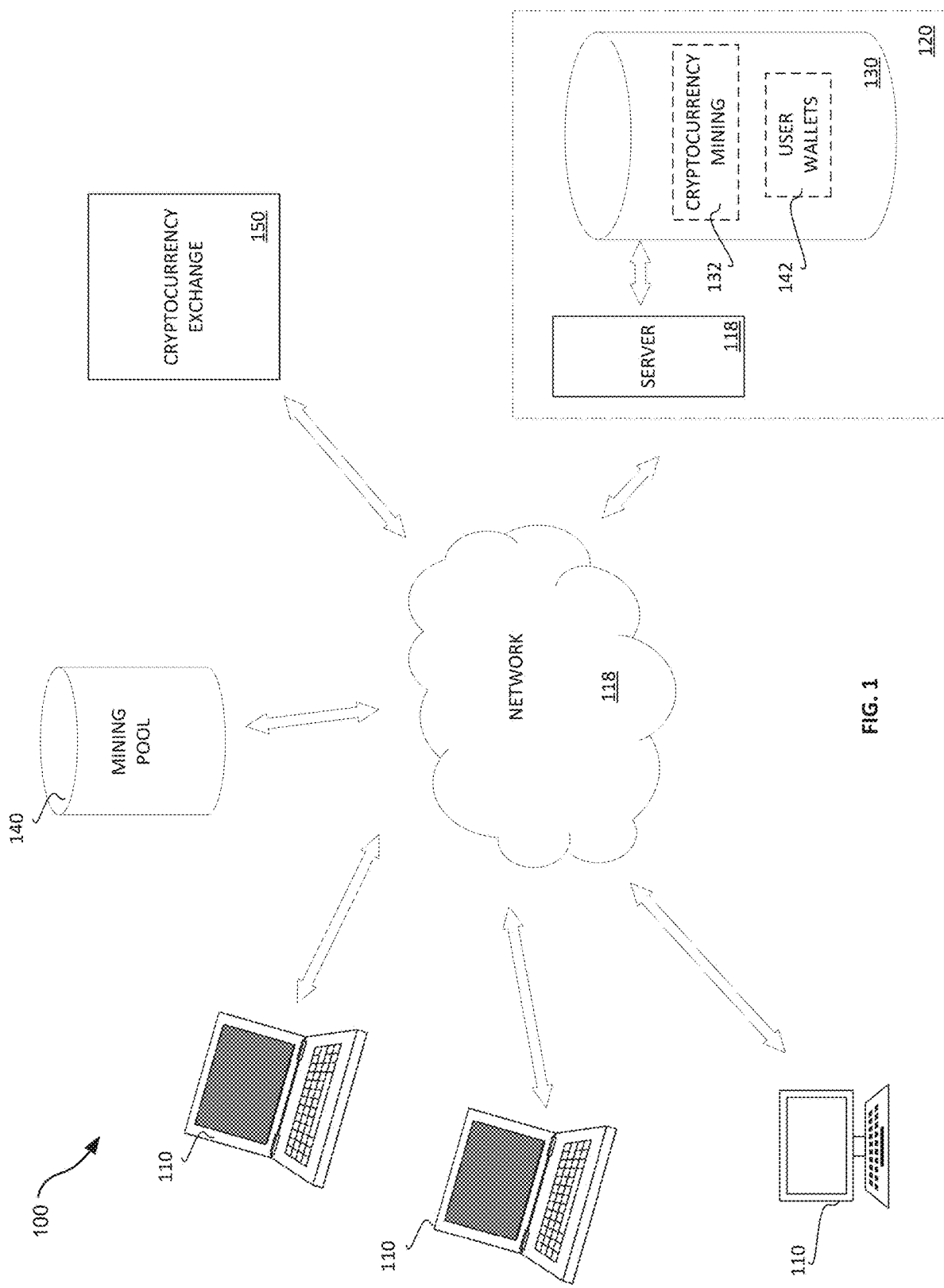
FIG. 1 is a system for enabling users of electronic devices to rent or otherwise allow utilization of at least portion of the processing power of such devices in exchange for software usage rights, licenses or other privileges or rewards.

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Attention is now directed to FIG. 1, which is a system 100 for enabling users of electronic devices 110 to rent or otherwise allow utilization of at least portion of the processing power of such devices 110 in exchange for software usage rights, licenses or other privileges or rewards. The user electronic devices 110 may include desktop computers, laptop computers, tablet computers and other electronic devices having sufficient processing capabilities to carry out tasks such as, for example, cryptocurrency mining operations. As is discussed below, in the embodiment of FIG. 1 each user electronic device 110 performs some form of cryptocurrency mining in exchange for a reward. In one embodiment the reward may comprise, for example, a subscription to an antivirus program or service implemented through the client application or a subscription credit to another software program or service.

The user electronic devices 110 are in communication over a network 118 with a server complex 120 having at least one server 118 and memory storage 130. The at least one server 118 is configured to execute a centralized component of a cryptocurrency mining application 132 operative to enable the user electronic devices 110 to perform cryptocurrency mining operations. The cryptocurrency mining operations performed by the user electronic devices 110 may yield units or partial units of an electronic currency (e.g., Bitcoin, Litecoin, Ethereum or Peercoin) mined by such devices 110. In one embodiment the user electronic devices 110 each contribute at least a portion of their respective processing resources to be used by a third party electronic currency mining pool 140 to perform the cryptocurrency mining operations. In consideration for usage of the processing resources of the user electronic devices 110, the mining pool 140 may provide the cryptocurrency mining application 132 with an aggregate reward that is generally in the form of a cryptocurrency (e.g., BitCoin or Ethereum). Alternatively, the user electronic devices 110 may receive rewards (e.g., cryptocurrency) from the operator of the mining pool 140 and then communicate these to the server 118 for pooling into the aggregate reward. In either case at least a portion of the aggregate reward is then credited to user accounts, or wallets 142, created and administered for each user by the application 132. The application 132 will generally effect such crediting to user accounts or wallets 142 on a pro rata basis; that is, each user account or wallet 142 is credited in accordance with the amount of cryptocurrency mining performed by the user device(s) 110 associated the wallet 142. The money (cryptocurrency or traditional currency) in the wallet 142 of each user can be used to pay for different services or products offered by, for example, an entity responsible for operation of the application 132.

In one embodiment the application 132 pools cryptocurrency associated with some or all of the user wallets 142 and creates a pooled transaction with a cryptocurrency exchange party 150. As a result of the exchange transaction, the cryptocurrency or "crypto coins" pooled from the user wallets 142 are transformed into a conventional currency, such as dollars or euros. The application 132 then updates the balance of each user account or wallet 142 to reflect the user's pro rata share of the conventional currency received through the exchange transaction. In this way the application 132 advantageously makes both the cryptocurrency mining process itself and the process of receiving compensation for the mining conducted by the electronic user devices 110 transparent to the users of such devices 110.

Figure 2:
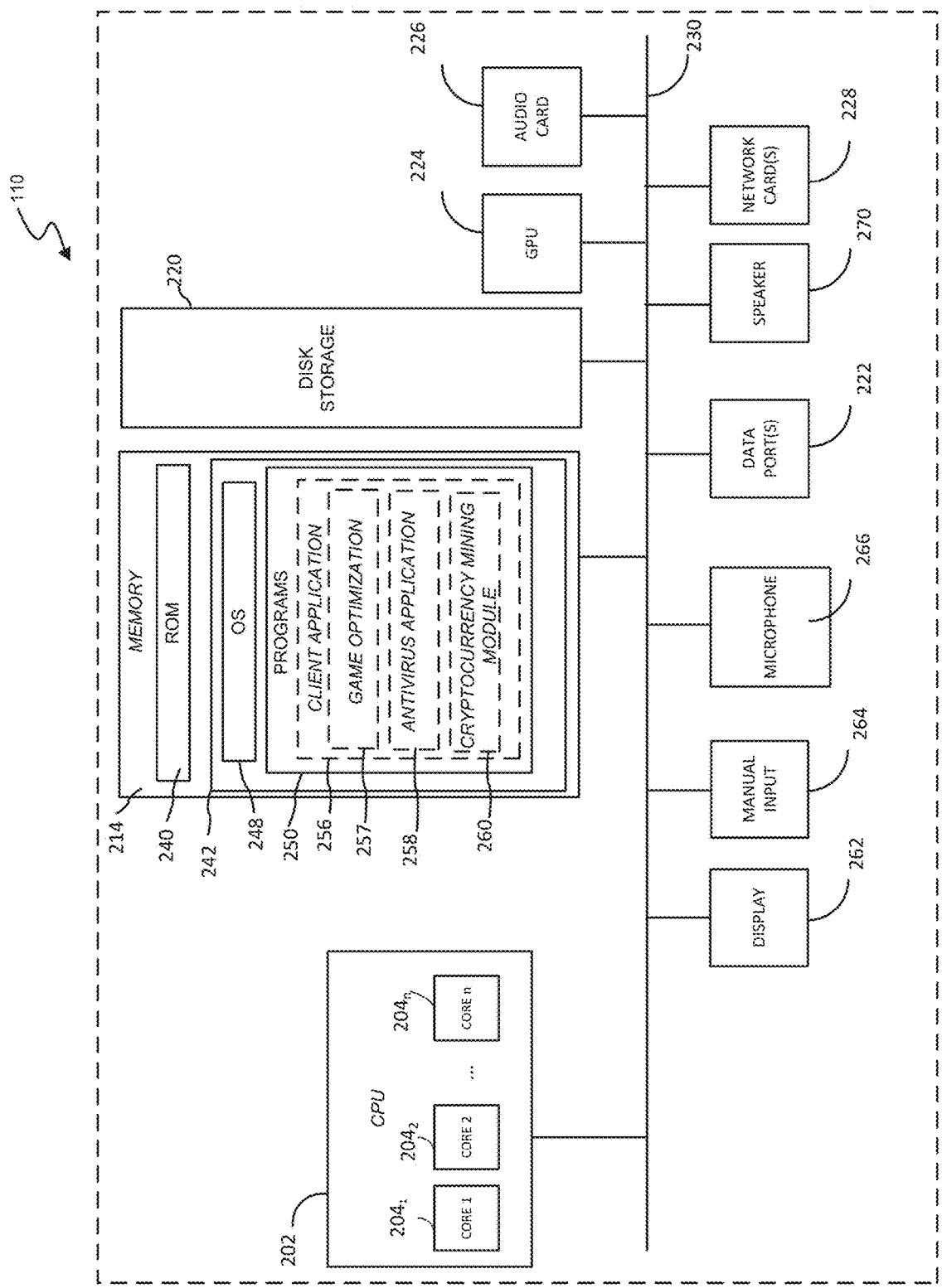
FIG. 2 is a block diagram illustrating the principal components of a user electronic device configured for cryptocurrency mining in accordance with an embodiment.

Turning now to FIG. 2, a block diagram is provided which illustrates the principal components of a user electronic device 110 in accordance with an embodiment. User electronic device 110 may be used to implement a desktop computer, a workstation, a laptop computer, or other type of data processing device. As shown, user electronic device 210 includes a multicore central processing unit ("CPU") 202 having a plurality of cores 204, system memory 214, disk storage 220, data port(s) 222, graphics processing unit (GPU) 224, audio card 226 and network card(s) 228 connected by system bus 230. System bus 230 may include a memory bus or memory controller, a peripheral bus, and a local bus, and may utilize any of a various known bus architectures. Network card(s) 228 may provide an Ethernet, Wi-Fi, GSM, Bluetooth or other wired, wireless, or cellular network interface for connecting user electronic device 110 to an external network, such as the Internet. Data port 222 may be any data port as is known in the art for interfacing with an external accessory using a data protocol such as RS-232, USB, or Firewire. Disk storage 220 may be a conventional read/write memory such as a magnetic disk drive, floppy disk drive, compact-disk read-only-memory (CD-ROM) drive, digital video disk (DVD) read or write drive, transistor-based memory or other computer-readable memory device as is known in the art for storing and retrieving data.

In one embodiment system memory 214 may include a read-only memory (ROM) 240 and random access memory (RAM) 242. The ROM 240 generally stores a basic input/output system (BIOS), which contains foundational routines to convey information between components of user electronic device 110. RAM 242 stores an operating system 248 (OS), such as, for example, Windows®, Linux or other type of OS. System memory 214 also stores application programs 250 currently executing as processes on the user electronic device 110. These applications 250 may include, for example, a client application 256 incorporating an antivirus program 258 and a cryptocurrency mining module 260 configured to perform some form of cryptocurrency mining in exchange for a corresponding rewards. The antivirus application 258 can advantageously be configured to allow execution of the cryptocurrency mining module 260 and to block other malicious mining attempts. In other implementations the client application 256 could include a program or module different from an antivirus program (e.g., a security program or an interactive game program).

CPU 202 communicates with a plurality of peripheral equipment. Additional peripheral equipment may include a display 262, manual input device 264 and microphone 266. Display 262 may be a visual display such as a liquid crystal display (LCD) screen, touch-sensitive screen, or other monitors as are known in the art for visually displaying images and text to a user. Manual input device 264 may be a conventional keyboard, keypad, mouse, trackball, or other input device as is known in the art for the manual input of data. Microphone 266 may be any suitable microphone as is known in the art for providing audio signals to CPU 202. In addition, a speaker 270 may be attached for reproducing audio signals from CPU 202. It is understood that microphone 260 and speaker 270 may include appropriate digital-to-analog and analog-to-digital conversion circuitry as appropriate.

Figure 3:
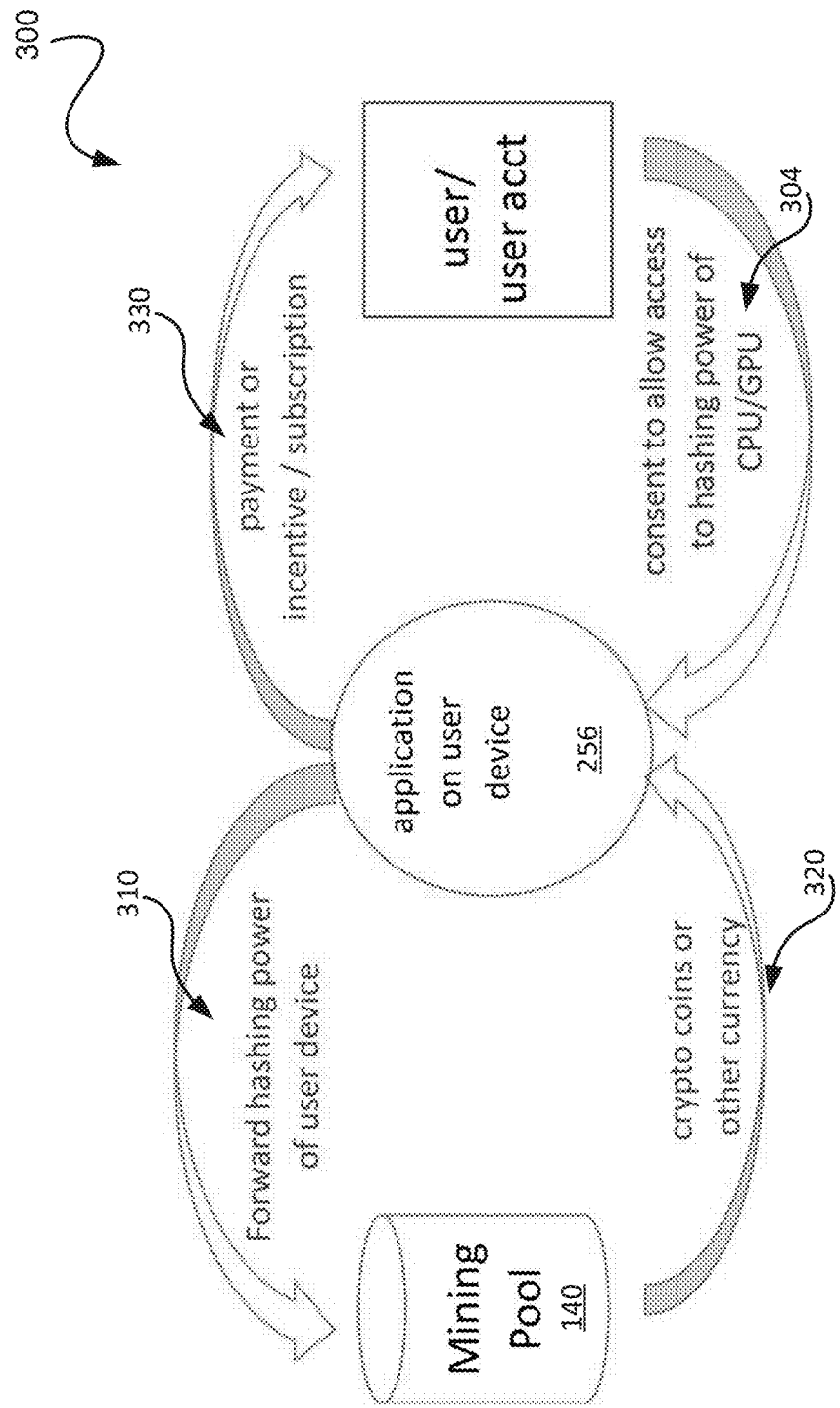
FIG. 3 is a flowchart providing an operational overview of exemplary operation of the system of FIG. 1, according to an embodiment.

FIG. 3 is a flowchart providing an operational overview 300 of exemplary operation of the system 100 of FIG. 1, according to an embodiment. As shown, a user of one of the electronic devices may provide consent to the client application 256 of the device 110 to effectively rent, lease or otherwise permit the mining pool 140 to use the processing power of the user device 110 in order to perform computational tasks, such as hashing, relating to the mining of cryptocurrencies (stage 304). Once such consent has been received, the application 256 effectively forwards the hashing power of the participating user devices to the cryptocurrency mining pool (stage 310). By facilitating the mining process carried out by the mining pool 140 in this way, the application 256 receives a reward from the operator or the mining pool 140 that is generally in the form of a cryptocurrency (stage 320). Alternatively, the mining pool 140 may provide the reward to the server 118 for apportionment by the application 132 to a user account associated with the user electronic device 110.

The application 132 will generally effect such apportioning to user accounts or wallets on a pro rata basis; that is, each user account is credited in accordance with the amount of cryptocurrency mining performed by the user device(s) 110 associated the user account. The money (cryptocurrency or traditional currency) in the account, or "wallet", of each user can be used to pay for different services or products offered through the application (stage 330). For example, such rewards could comprise a free or discounted subscription to the antivirus program 258 or service. In addition, based upon the usage of the processing resources of the user device 110 reported by the client application may 256, the cryptocurrency mining application 132 may be configured to adjust the amount of the reward or incentive provided. In this way a user willing to permit a third party (e.g., the mining pool 140) to utilize the processing resources of the user's electronic user device 110 is provided with the opportunity to use valuable software applications (e.g., like antivirus software) for free or at a reduced cost.

Figure 4:
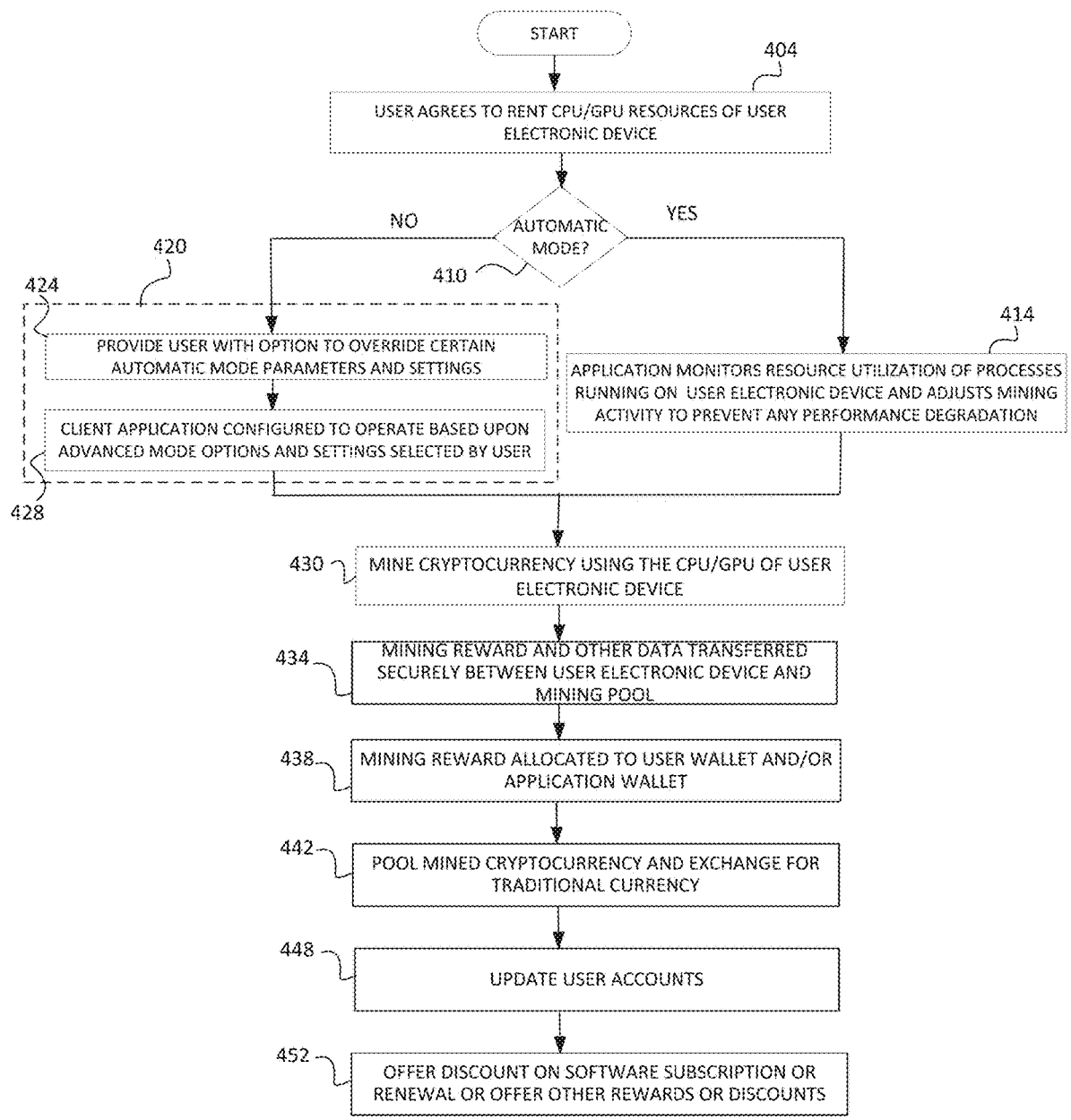
FIG. 4 is a flowchart providing a more detailed representation of an exemplary process for mining electronic currency in exchange for software usage rights or other rewards capable of being implemented within the system of FIG. 1.

Attention is now directed to FIG. 4, which is a flowchart providing a more detailed representation of an exemplary process for mining electronic currency in exchange of software usage rights or other rewards capable of being implemented within the system 100. The process begins when a user of one of the electronic devices provides consent, through a user interface generated by the client application 256 or otherwise, to permit at least a portion of the processing power of the CPU 202 and/or GPU 224 of the device 110 to be rented or otherwise utilized for the mining of electronic currency (stage 404). If an automatic mode of the client application 256 has been selected (stage 410), then the client application 256 ensures that any mining activity undertaken by the user electronic device 110 does not degrade its performance. Specifically, the application 256 monitors resource utilization of processes running on the user electronic device in the manner described hereinafter and adjusts mining activity to prevent any performance degradation (stage 414).

If the automatic mode has not been selected (stage 410), then operation in an advanced mode is initiated (stage 420). In the advanced mode a user of the electronic device 110 is provided with the option to override certain parameters and settings of governing operation of the electronic device 110 in the automatic mode (stage 424). For example, while in the advanced mode a user may specify, through an idle mode setting, that the mining process may start only when the device 100 has been idle, i.e., has not experienced any user activity, for several minutes. A user may also specify, by selecting a game mode option, that the mining process should be stopped or prevented from starting if an electronic game program is being executed by the device 110. Selection of a full screen mode option prevents the mining process from starting or continuing if an application executed by the device 110 utilizing a full screen display capability. Selection of this option may when, for example, the device 110 is being used for a presentation. During advanced mode operation a user may also configure a thread counts setting in order to set a number of hashing threads that are used for mining. In one embodiment of the automatic mode, threads are computed in relation to the CPU cores 204. A user may also configure a CPU percentage setting to specify a maximum load which may be undertaken by the CPU 202 during the mining process. Alternatively or in combination with gaming mode setting, the mining process can be stopped or restricted to a specific processor core(s) 204 during game play. Because of the tuning of the mining process effected through the various parameter settings and performance counters discussed above, the cryptocurrency mining performed by each device 110 will generally not impact the user experience. Once the user has specified which automatic mode settings are to be overridden (stage 424), the client application 256 is configured to operate with the advanced mode settings provided by the user (stage 428).

Referring again to FIG. 4, once either the automatic mode has been selected (stage 410) or selected automatic mode parameter settings have been overridden during advanced mode operation (stage 420), the CPU 202 or GPU 224 of the device may be utilized by the cryptocurrency mining module 260 for cryptocurrency mining operations (stage 430). The client application 256 handles the data transfer, between the electronic device 110 and the mining pool 140, associated with the cryptocurrency mining operations in a secure way (stage 434). Mining rewards commensurate with the extent of the cryptocurrency mining operations performed by the electronic device 110 may be allocated to user wallet associated with a user of the electronic device 110 (stage 438).

In one embodiment the application 132 executing on the server 118 pools the cryptocurrency included within some or all of the user wallets associated with the electronic device 110 and creates a pooled transaction with the cryptocurrency exchange party 150. Specifically, the application 132 interacts with the cryptocurrency exchange party 150 to exchange the resulting pool of cryptocurrency for a corresponding amount of traditional currency (stage 442). As a result of the exchange transaction, the cryptocurrency or "crypto coins" pooled from the user wallets are transformed into a conventional currency, such as U.S. dollars or Euros. This approach of pooling the cryptocurrency mined by the electronic devices 110 and then exchanging it in bulk for traditional currency via one large transaction minimizes transaction fees and obviates the need for users of individual electronic devices to transact with a cryptocurrency exchange party through multiple smaller transactions. Grouping smaller user transactions into a larger one in this manner also enables the minimum threshold for currency withdrawal from the external mining pool 140 to be exceeded.

The user wallets or accounts are then updated by the application 132 to reflect accrual of a pro rata share of the amount of traditional currency received from the cryptocurrency exchange party 150 (stage 448). In this regard the mining contribution associated with each user account can be evaluated from the user wallet for the account or directly from a shared application wallet maintained by the application 132 in order to fairly reward each user. The application 132 thus advantageously makes both the cryptocurrency mining process itself and the process of receiving compensation for the mining conducted by the electronic user devices 110 transparent to the users of such devices.

Figure 5:
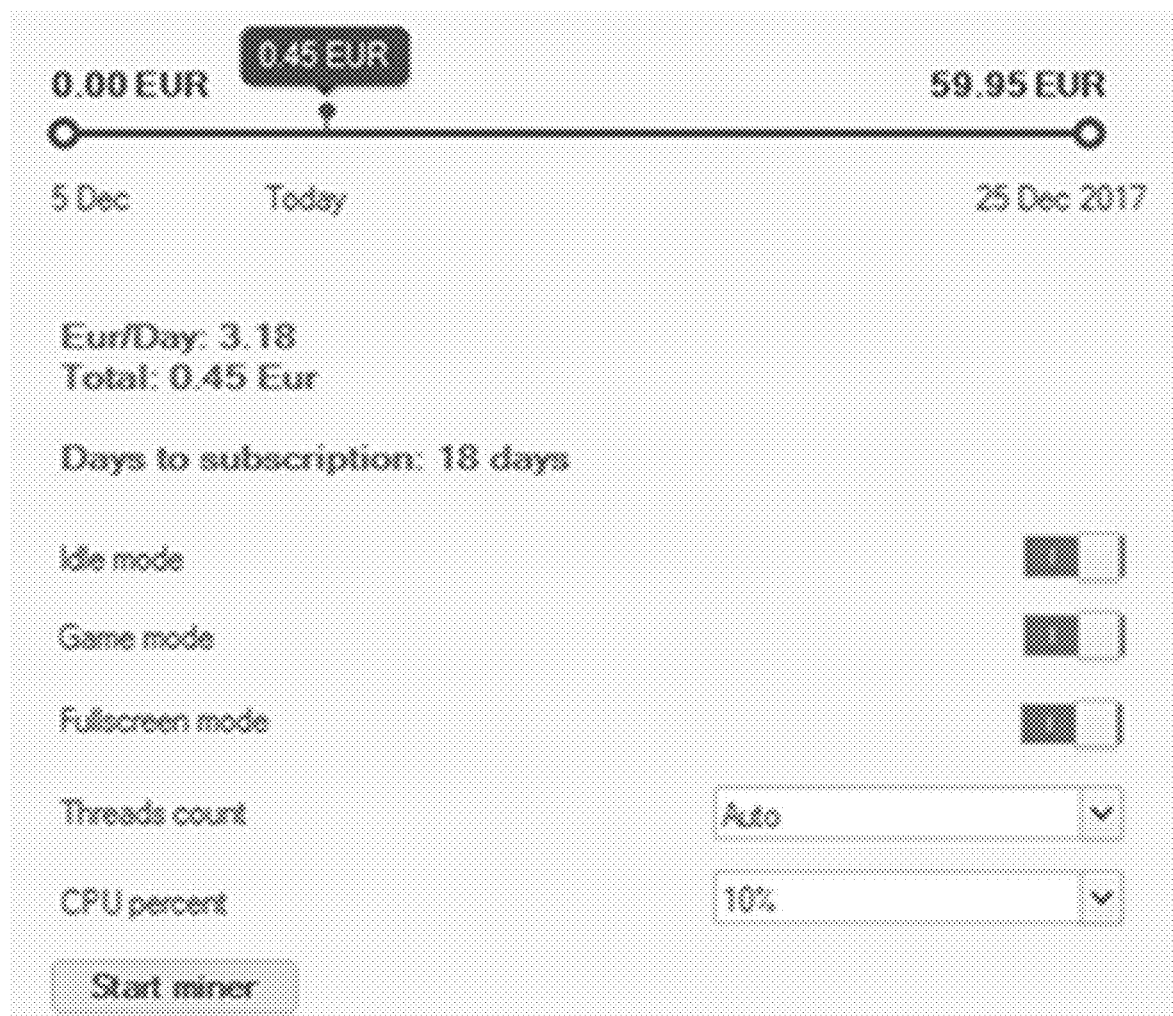
FIG. 5 is a user interface which indicates an updated account value and advanced or automatic mode settings associated with the account.

In one embodiment the client application 256 and/or the application 132 executing on the server 118 are configured to enable each user to check their respective account or wallet balance, which will generally be presented in a traditional currency, such as Euro. FIG. 5 is an exemplary user interface generated by client application 256 and/or the application 132 which indicates an updated account value and the advanced or automatic mode settings associated with the account. In one embodiment when the value of a user account exceeds a predefined amount, the corresponding user is automatically rewarded with free or discounted subscription to the antivirus application 258 or with other discounts or rewards.

In one embodiment the user electronic device 110 may be configured so as to improve the performance of various applications such as computer games, streaming media or other applications characterized by high framerates, or applications which otherwise use relatively high levels of CPU or GPU resources. As discussed below, methods may be used to protect such games and other high-utilization processes from interference caused by the execution of the cryptocurrency mining module 260 or other programs, thus improving game performance and the user experience. In addition to game applications, the teachings herein may also be applied to enhance the performance of other programs or functions which require or involve high framerates or CPU usage (e.g., viewing a 4K or High Definition video or running a complex graphics application).

Figure 6:
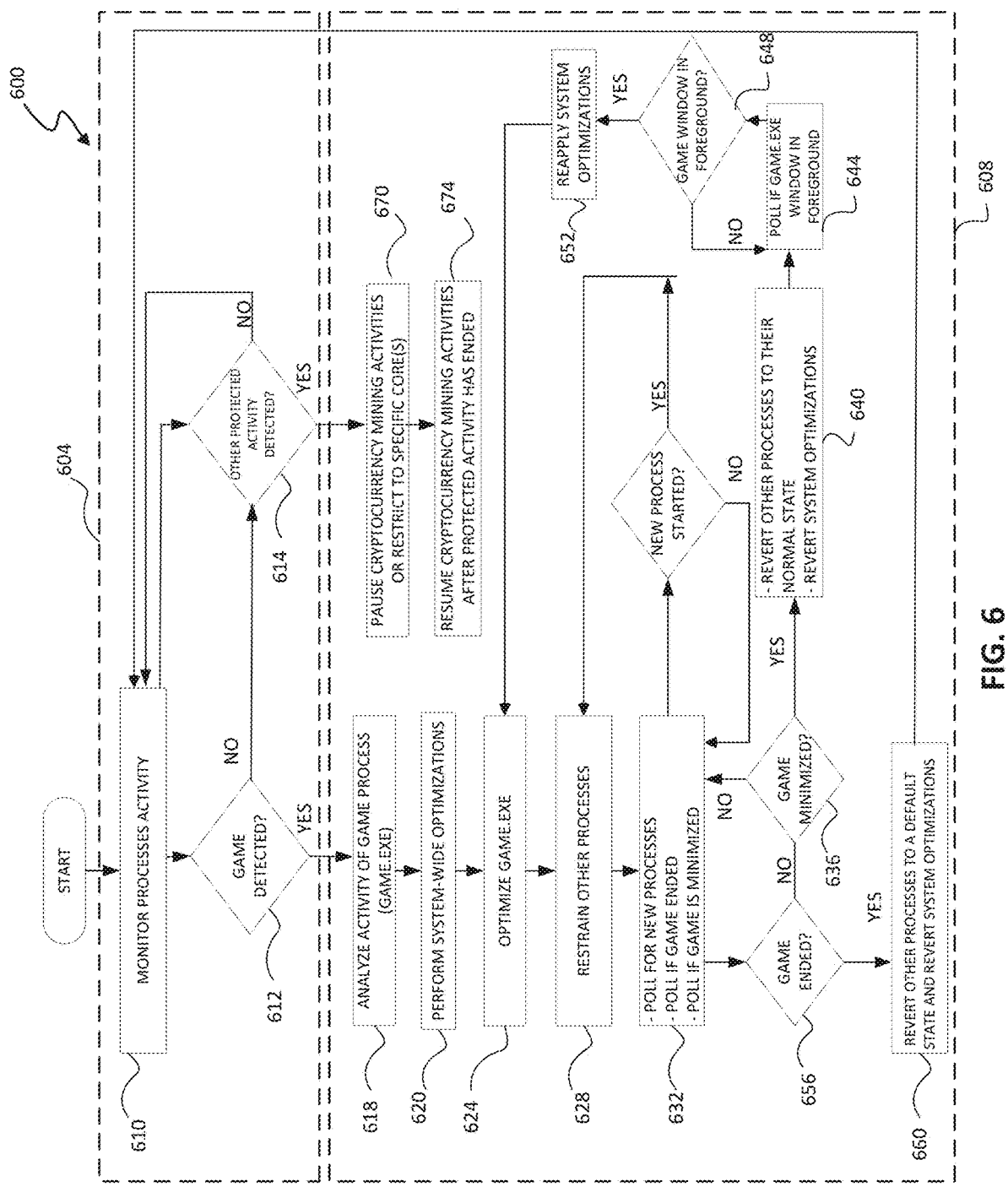
FIG. 6 is a flowchart representative of a method for improving game performance in accordance with the disclosure.

Attention is now directed to FIG. 6, which is a flowchart representative of a method 600 for improving game performance in accordance with the disclosure. In one embodiment the detection and optimization operations described with reference to FIG. 6 are performed by the game optimization module 257 of the client application 256. However, in other implementations these operations could be carried out by a standalone application program or by a module within a different application program (e.g., a security program).

As shown, the method 600 may include a detection phase 604 and an optimization phase 608. During the detection phase, processes executed by the CPU 202 are typically monitored at a regular time intervals such as, for example, once per second (stage 610). Such monitoring may include, for example, determining when the utilization of the GPU 224 by a process exceeds a given threshold (e.g., 50% of the resources of the GPU 224 consumed by the process). When this occurs a check may be made to determine if the process is running in (i) a fullscreen mode, or (ii) a windowed mode in which the window for the process is in the foreground. If either condition (i) or (ii) exists and the GPU utilization by the process exceeds the given threshold, then in one embodiment it is determined that the process is a game (stage 612). As an alternative to the implementation of stage 612 discussed above or as an additional check as part of such implementation, system hooks could be installed in the initialization functions of the most popular APIs for rendering 2D and 3D vector graphics currently in existence (e.g., DirectX and OpenGL) in order to detect processes causing such APIs to be initialized. Another method would be to simply enumerate the loaded libraries of each process and determinate if one of those libraries is related to one of the graphics APIs. It has been found that if a relatively high percentage (e.g., greater than 50%) of the resources of the GPU 224 are utilized by a process and a graphics API such as DirectX or OpenGL has been loaded, there exists a high likelihood that the process is a game.

It has been recognized that certain processes such as, for example, web browsers, Winword, Skype, Dropbox or other applications with a graphical user interface that loads one of the graphics APIs, may affect processor resource utilization in a similar manner to games. Such processes usually do not need high computer resource usage, so their optimization is not desirable. The threshold for GPU usage should be set high enough so that these kind of processes are not identified as games. However, false positives may theoretically occur. In these cases the game optimization module 257 may be configured so as to not automatically begin the optimization phase 608 with respect to such a process but to instead enable a user to select whether the optimization phase 608 should proceed. Such user selection could be made through, for example, settings associated with the game optimization module or through a "pop-up" menu or interface rendered via the display 262 at the conclusion of stage 604.

In the event the execution of a game is not detected (stage 612) when the utilization of the GPU 224 (or CPU 202) by a process exceeds a given threshold, it may be determined whether a resource-intensive process detected during stage 610 corresponds to an activity besides a game for which it is desired to protect the user experience (e.g., viewing a 4K or High Definition video or running a complex graphics application). The optimization phase 608 may begin once it has been determined during the detection phase 604 that one of the processes executed by the CPU 202 corresponds to a game (stage 612) or another protected activity (stage 614).

When execution of a game has been detected (stage 612), the optimization phase 608 may begin by monitoring the utilization of the CPU 202 by the threads of the game process in order to determine the number of threads of the game associated with high utilization of the CPU 202 (stage 618). The thread information collected may be useful in subsequently determining which and how many CPU cores 204 should be allocated to the game and which CPU cores 204 should be left for other processes. Next, in one embodiment, system-wide optimizations intended to enhance performance of the detected game process (game.exe) are performed (stage 620). These optimizations may include, for example, switching to a customized higher performance power plan, launching a user configured program with parameters, stopping or freezing various unneeded processes, pausing any cryptocurrency mining operations, and/or delaying certain scheduled tasks (stage 620). In one embodiment the customized higher performance power plan may disable core parking (e.g., on all cores 204 or on non-hyper-threaded cores 204), set minimum processor state to 100%, set processor performance boost policy to 100% (if available), set the PCI express link state power management to off, and disable turning off disk storage 220. The user-configured program could be, for example, an overclocking program for the GPU 224 or CPU 202.

Referring again to FIG. 6, the game optimization module 257 will typically be configured to perform a number of operations designed to optimize execution of the detected game process (stage 624). For example, if hyper-threading is enabled then the game optimization module 257 may set the process affinity for the detected game process to certain non-hyper-threaded cores 204; that is, the game optimization module may cause certain non-hyper-threaded cores to be allocated to the detected game process.

Figure 7:
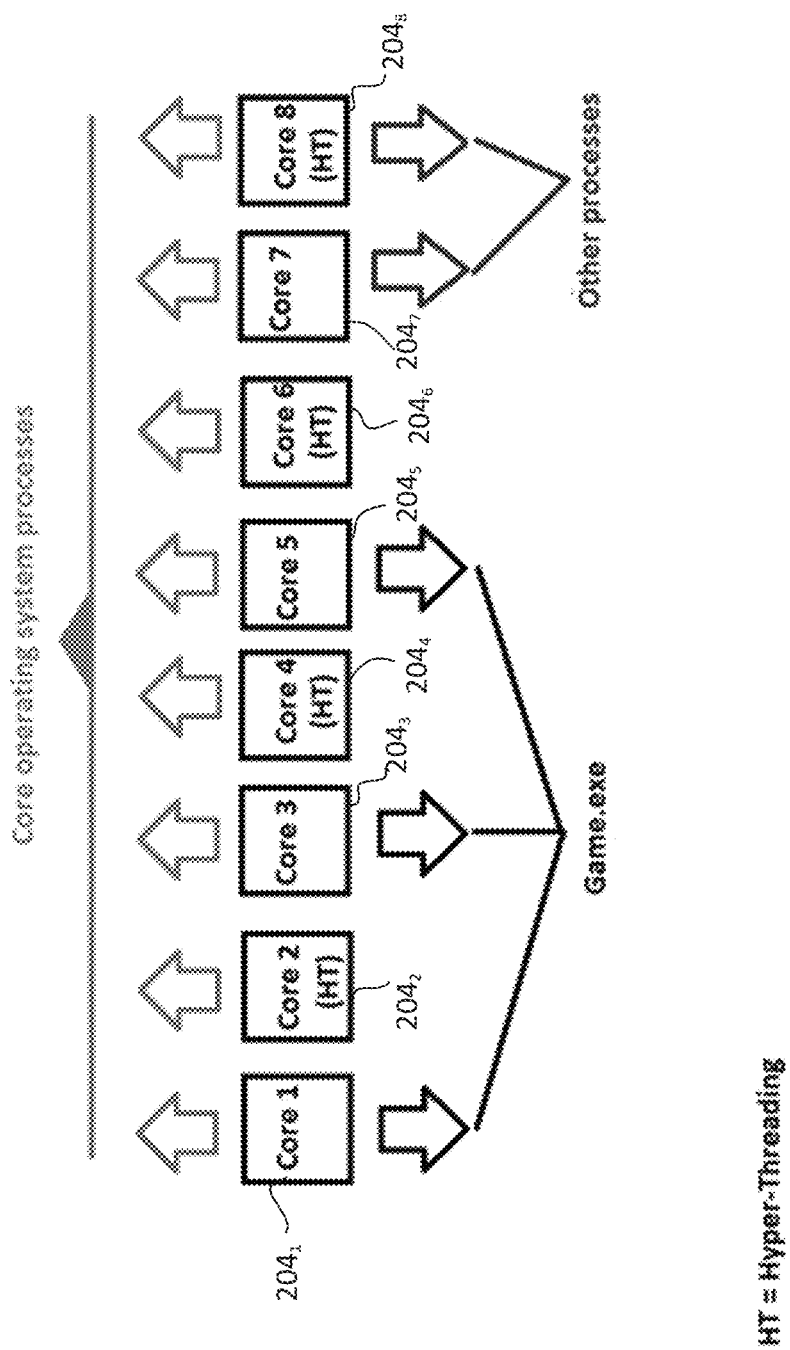
FIG. 7 illustrates one manner in which process affinity of a game process may be set in a system including a set of eight (8) processor cores when hyper-threading is present.

FIG. 7 illustrates one manner in which process affinity of the game process may be set in an electronic device 110' including a set of eight (8) processor cores 204 when hyper-threading is present. As shown, in the example of FIG. 7 all non-hyper-threaded CPU cores 204 except for core $204_7$ and core $204_8$ an allocated to the detected game process (game.exe). In this approach CPU core $204_7$ and core $204_8$ are used for other running processes. In addition, the game optimization module 257 may park the hyper-threaded CPU cores $204_2$, $204_4$, and $204_6$ in order to reduce the heat generated by the CPU 202 during execution of the detected game process.

Figure 8:
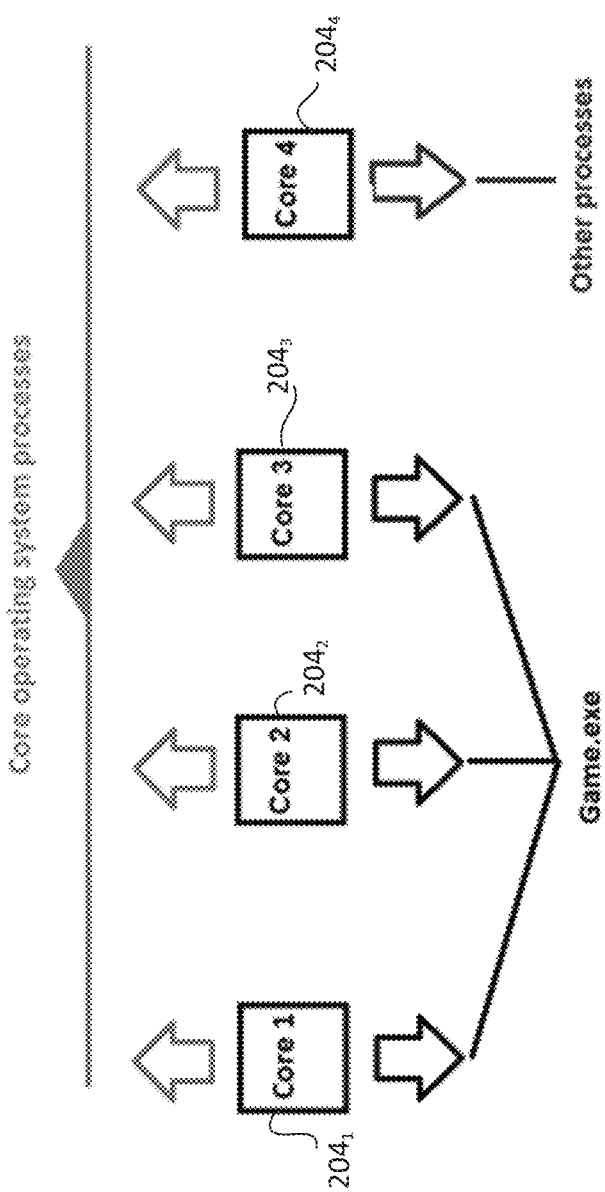
FIG. 8 shows an exemplary setting of process affinity for a detected game process in a system including a set of four (4) CPU cores when hyper-threading is not present.

Turning now to FIG. 8, there is shown an exemplary setting of process affinity for the detected game process in a device 110" including a set of four (4) CPU cores 204 when hyper-threading is not present. In this case the process affinity is set to processor cores $204_1$, $204_2$, and $204_3$, with CPU core $204_4$ being used for the other running processes.

As part of the game process optimization procedure (stage 624), the CPU priority and disk access (IO) priority of the game process will generally be increased to the highest available level that doesn't result in system instability (e.g., above normal or high priority). Networking priority of the game process can also be increased. In one embodiment, key processes of the operating system 248 (e.g., smss.exe or csrss.exe in the case of Windows) will not have their affinity modified, since doing so could potentially result in interference with the game's performance.

Referring again to FIG. 6, the process affinity of other running processes may be set to those of the CPU cores 204 not allocated to the game process in order to minimize the potential for interference with the game process (stage 628). In the example of FIG. 7, the process affinity of other processes is set to CPU core $204_4$. The CPU and IO priorities of these other running processes may also optionally be lowered as part of stage 628. In embodiments in which all cryptocurrency mining activities are not automatically paused during stage 620, the process affinity of running processes associated with such mining activities may also be set to those of the CPU cores 204 not allocated to the game process.

The game optimization module 257 will generally be configured to continuously monitor the electronic device 110 for any new processes and to identify any game processes that have ended or have been minimized (e.g., taken out of fullscreen mode or the foreground) (stage 632). In the case of new non-game processes, their process affinity will be set to be the same as that of any other running non-game processes; that is, any new non-game processes will typically be allocated to CPU cores 204 not allocated to a game process. The network, I/O and other priorities of any new process may also be lowered for the duration of any detected game process. If a game is minimized (stage 636), it is likely the case that a user of the game desires to interact with other programs. Accordingly, in that case some or all system optimizations may be reverted to a default state so that multitasking performs better and the process affinities of other processes may be reset to their normal or default condition (stage 640). In one embodiment, monitoring of minimized game processes continues to occur after such reversion of system optimizations and other processes to default or otherwise normal operating conditions; that is, minimized game processes are monitored to determine if they again are brought to the foreground (stage 644). If any minimized game processes are determined to have been subsequently brought to the foreground (stage 648), then optimizations previously applied may again become active (stage 652).

At some point the game optimization module 257 will generally determine that a game process has ended (stage 656). At this point all processes will typically have their respective process affinities and priorities restored to initial values and the active power plan will be switched to the power plan in effect before the game started (stage 660).

When execution of another protected activity (e.g., viewing of a 4K or High Definition video or running a complex graphics application) has been detected (stage 614), the optimization phase 608 may proceed by ending any processes known to correspond to cryptocurrency mining or restricting such processes to specific process core(s) 204. Once the client application 256 has determined that a given protected activity has ended, cryptocurrency mining operations may be resumed and/or restrictions relating to which processor core(s) 204 may perform such operations may be lifted (stage 674). Of course, in other embodiments system-wide optimizations of the type performed when a game process is detected (stage 612) may also be performed during stage 608 upon detection of other protected activities (stage 614).

Although embodiments presented herein describe user electronic devices 110 in communication with both the mining pool 140 and the server complex 120, in other embodiments a mining pool could itself configured to handle all communication with user electronic devices 110, pool mined cryptocurrency for exchange with a third party cryptocurrency exchange, and generally perform the functions described herein as being performed by the server complex 120.

In some configurations, the apparatus or system includes means for performing various functions as described herein. In one aspect, the aforementioned means may be a module including a processor or processors and associated memory in which embodiments of the invention reside, such as are shown in the preceding drawings and which are configured to perform the functions recited by the aforementioned means. This may be, for example, modules or apparatus residing in client devices, host server systems, and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A method for facilitating utilization of processing resources of a plurality of user electronic devices for mining of cryptocurrency wherein the plurality of user electronic devices are configured with a corresponding plurality of user applications, each of the plurality of user applications including code for a cryptocurrency mining module and code for antivirus protection, the method comprising:

receiving, from a first of the plurality of user electronic devices, first mining activity data indicative of the extent to which the first user electronic device is utilized by a cryptocurrency mining pool to perform cryptocurrency mining operations, the first user electronic device including a first user application including:

first code for a first cryptocurrency mining module, the first code including at least an idle mode setting and a game mode setting, the idle mode setting, upon selection by a first user utilizing the first electronic device, prevents the first user electronic device from starting cryptocurrency mining operations except when the first user electronic device detects that it has not experienced any user activity for more than a predefined amount of time; and second code for antivirus protection, the second code for antivirus protection configured to allow execution of the first code for the cryptocurrency mining module in the first user application in order to enable the cryptocurrency mining operations to occur even when antivirus protection is enabled and to block other malicious mining attempts; and wherein the first user electronic device is configured to monitor usage of computer resources by processes executing on the first user electronic device and to automatically adjust the cryptocurrency mining operations to prevent performance degradation of the first user electronic device when operating in an automatic mode;

receiving, from a second of the plurality of user electronic devices, second mining activity data indicative of the extent to which the second user electronic device is utilized by the cryptocurrency mining pool to perform the cryptocurrency mining operations, the second user electronic device including a second user application including:

third code for a second cryptocurrency mining module, the third code including the idle mode setting and the game mode setting, the game mode setting, upon selection by a second user, prevents the second user electronic device from starting cryptocurrency mining operations when a game program is running in a non-minimized state, the second user application configured to adjust an operating parameter of the second user device when the second user device includes the game program operating in the non-minimized state; and fourth code for antivirus protection, the fourth code for antivirus protection configured to allow execution of third code for the second cryptocurrency mining module in the second user application in order to enable the cryptocurrency mining operations to occur even when antivirus protection is enabled and to block other malicious mining attempts;

wherein at least a first portion of the cryptocurrency mining operations are performed by the first electronic device while in the idle mode and at least a second portion of the cryptocurrency mining operations are performed by the second electronic device while in the game mode; and receiving, from at least one of the cryptocurrency mining pool and a cryptocurrency server separate from the cryptocurrency mining pool, an aggregate amount of cryptocurrency including an aggregation of the cryptocurrency mining operations performed by the first user electronic device and the second user electronic device;

exchanging, by communicating with a cryptocurrency exchange server, the aggregate amount of cryptocurrency for an aggregate amount of currency other than cryptocurrency; and allocating the aggregate amount of currency among a plurality of user accounts respectively associated with the plurality of user electronic devices.

2. The method of claim 1 further including directing a reward to one of the plurality of user accounts having an account balance exceeding a predefined amount of currency.

3. The method of claim 2 wherein the reward relates to a subsidized subscription to one of the plurality of user applications.

4. The method of claim 3 wherein the subsidized subscription corresponds to a free subscription to the one of the plurality of user applications.

5. The method of claim 3 wherein each of the user applications includes code for interactive electronic gaming.

6. The method of claim 1, further including:
determining, based upon the monitoring, that one of the processes is consuming greater than a predefined threshold of the computer resources; and
stopping ones of the processes corresponding to the cryptocurrency mining operations or delaying execution of one or more scheduled tasks corresponding to the cryptocurrency mining operations.

7. The method of claim 1 wherein the first code includes a full screen mode setting configurable to, upon selection of the full screen mode setting by the first user, restrict the first user electronic device from performing the cryptocurrency mining operations when the first user electronic device is operating in a full screen mode.

8. The method of claim 7, further including:
monitoring usage of computer resources by processes executing on the first user electronic device;
determining, based upon the monitoring, that one of the processes is consuming greater than a predefined threshold of the computer resources; and
stopping ones of the processes corresponding to the cryptocurrency mining operations or delaying execution of one or more scheduled tasks corresponding to the cryptocurrency mining operations.

9. The method of claim 1 wherein the first user application includes a thread count setting which sets a number of hashing threads which may be used for the cryptocurrency mining operations.

10. The method of claim 1 wherein the first user application includes a CPU percentage setting which sets a maximum load of a processor of the one of the plurality of user electronic devices during performance of the cryptocurrency mining operations.

11. The method of claim 1 wherein the first user application includes a multicore processor having a plurality of cores, and wherein the multicore processor executes a plurality of processes, the method further including allocating one or more of the plurality of cores to ones of the processes corresponding to the cryptocurrency mining operations wherein other of the plurality of cores are allocated to remaining ones of the processes.

12. The method of claim 1 wherein the first user application is provided to the first user electronic device and the second user application is provided to the second user electronic device over a network.

13. A method for facilitating utilization of processing resources of a plurality of user electronic devices for mining of cryptocurrency wherein the plurality of user electronic devices are configured with a corresponding plurality of user applications, each of the plurality of user applications including code for a cryptocurrency mining module and code for antivirus protection, the method comprising:

receiving, from a first of the plurality of user electronic devices, first mining activity data indicative of the extent to which the first user electronic device is utilized by a cryptocurrency mining pool to perform cryptocurrency mining operations, the first user electronic device including a first user application including:

first code for a first cryptocurrency mining module, the first code including an idle mode setting that, upon selection by a first user utilizing the first electronic device of the idle mode setting, prevents the first user electronic device from starting cryptocurrency mining operations except when the first user electronic device detects that it has not experienced any user activity for more than a predefined amount of time; and second code for antivirus protection, the second code for antivirus protection configured to allow execution of the first code for the cryptocurrency mining module in the first user application in order to enable the cryptocurrency mining operations to occur even when antivirus protection is enabled and to block other malicious mining attempts; and wherein the first user electronic device is configured to monitor usage of computer resources by processes executing on the first user electronic device and to adjust the cryptocurrency mining operations to prevent performance degradation of the first user electronic device;

receiving, from a second of the plurality of user electronic devices, second mining activity data indicative of the extent to which the second user electronic device is utilized by the cryptocurrency mining pool to perform the cryptocurrency mining operations, the second user electronic device including a second user application including:

third code for a second cryptocurrency mining module, the third code including a game mode setting that, upon selection by a second user of the game mode setting, prevents the second user electronic device from starting cryptocurrency mining operations when a game program is running in a non-minimized state, the second user application configured to adjust an operating parameter of the second user device when the second user device includes the game program operating in the non-minimized state; and fourth code for antivirus protection, the fourth code for antivirus protection configured to allow execution of third code for the second cryptocurrency mining module in the second user application in order to enable the cryptocurrency mining operations to occur even when antivirus protection is enabled and to block other malicious mining attempts;

wherein at least a first portion of the cryptocurrency mining operations are performed by the first electronic device while in the idle mode and at least a second portion of the cryptocurrency mining operations are performed by the second electronic device while in the game mode; and receiving value in consideration of the cryptocurrency mining operations performed by one of the plurality of user electronic devices wherein the received value is in the form of at least one of a cryptocurrency and a currency other than cryptocurrency;

wherein the received value is used as payment for at least a portion of a fee associated with usage of the one of the plurality of user applications associated with the one of the plurality of user electronic devices.

14. A computer-implemented system for facilitating utilization of processing resources of a plurality of user electronic devices for mining of cryptocurrency, the system comprising:

a processor; and a memory including instructions which, when executed by the processor, cause the processor to:

receive, from a first of the plurality of user electronic devices, first mining activity data indicative of the extent to which the first user electronic device is utilized by a cryptocurrency mining pool to perform cryptocurrency mining operations, the first user electronic device including a first user application including:

first code for a first cryptocurrency mining module, the first code including an idle mode setting that, upon selection by a first user utilizing the first electronic device of the idle mode setting, prevents the first user electronic device from starting cryptocurrency mining operations except when the first user electronic device detects that it has not experienced any user activity for more than a predefined amount of time such that, based on the idle mode setting being selected by the first user, cryptocurrency mining operations are only able to start on the first user electronic device after the first user electronic device detects that it has not experienced any user activity for more than the predefined amount of time; and second code for antivirus protection, the second code for antivirus protection configured to allow execution of the first code for the cryptocurrency mining module in the first user application in order to enable the cryptocurrency mining operations to occur even when antivirus protection is enabled and to block other malicious mining attempts; and wherein the first user electronic device is configured to monitor usage of computer resources by processes executing on the first user electronic device and to automatically adjust the cryptocurrency mining operations to prevent performance degradation of the first user electronic device when operating in an automatic mode;

receive, from a second of the plurality of user electronic devices, second mining activity data indicative of the extent to which the second user electronic device is utilized by the cryptocurrency mining pool to perform the cryptocurrency mining operations, the second user electronic device including a second user application including:
- third code for a second cryptocurrency mining module, the third code including a game mode setting that, upon selection by a second user of the game mode setting, prevents the second user electronic device from starting cryptocurrency mining operations when a game program is running in a non-minimized state, the second user application configured to adjust an operating parameter of the second user device when the second user device includes the game program operating in the non-minimized state; and
- fourth code for antivirus protection, the fourth code for antivirus protection configured to allow execution of third code for the second cryptocurrency mining module in the second user application in order to enable the cryptocurrency mining operations to occur even when antivirus protection is enabled and to block other malicious mining attempts; and receive, from at least one of the cryptocurrency mining pool and a cryptocurrency server separate from the cryptocurrency mining pool, an aggregate amount of cryptocurrency;

exchange, by communicating with a cryptocurrency exchange server, the aggregate amount of cryptocurrency for an aggregate amount of currency other than cryptocurrency; and allocate the aggregate amount of currency among a plurality of user accounts respectively associated with the plurality of user electronic devices.

15. A user electronic device configured for mining of cryptocurrency, the user electronic device including:
a processor; and
a memory including computer code executable by the processor, the computer code including:
- code for a user application including both code for a cryptocurrency mining module and code for antivirus protection wherein the code for the cryptocurrency mining module is configured to cause the processor to send mining activity data indicative of the extent to which the user electronic device is utilized by a cryptocurrency mining pool to perform cryptocurrency mining operations, the user application being configured with application settings establishing conditions under which the user electronic device may be utilized to perform the cryptocurrency mining operations wherein the application settings include at least a full screen mode setting and an idle mode setting, the full screen mode setting, upon selection by a user, preventing the user electronic device from performing the cryptocurrency mining operations when the user electronic device detects that the user electronic device is operating in a full screen mode, and the idle mode setting, upon selection by the user, prevents the user electronic device from starting cryptocurrency mining operations except when the user electronic device detects that it has not experienced any user activity for more than a predefined amount of time, and wherein the code for antivirus protection is configured to allow execution of the code for the cryptocurrency mining module in the one of the user applications in order to enable the cryptocurrency mining operations to occur even when antivirus protection is enabled and to block other malicious mining attempts;
- code for monitoring usage of processor resources by processes executing on the processor;
- code for determining, based upon the monitoring usage, that one of the processes is consuming greater than a predefined threshold of the computer resources; and
- code for stopping at least one of the processes corresponding to the cryptocurrency mining operations or delaying execution of one or more scheduled tasks corresponding to the cryptocurrency mining operations.

16. The user electronic device of claim 15 wherein the code for the user application includes code for interactive electronic gaming.

17. The user electronic device of claim 15 wherein the application settings include an idle mode setting configurable to restrict the user electronic device from performing cryptocurrency mining operations except when the user electronic device has been idle for more than a predefined amount of time.

18. The user electronic device of claim 15 wherein the application settings include a game mode setting configurable to restrict the user electronic device from performing the cryptocurrency mining operations when the user electronic device is executing an interactive electronic game application.

19. The user electronic device of claim 15 wherein the application settings include a thread count setting which sets a number of hashing threads which may be used for the cryptocurrency mining operations.

20. The user electronic device of claim 15 wherein the application settings include a CPU percentage setting which sets a maximum load of the processor during performance of the cryptocurrency mining operations.

21. The user electronic device of claim 15 wherein the processor includes a multicore processor having a plurality of cores wherein the multicore processor executes a plurality of processes, the computer code further including code for allocating one or more of the plurality of cores to ones of the processes corresponding to the cryptocurrency mining operations wherein other of the plurality of cores are allocated to remaining ones of the processes.

* * * * *